US010446090B2

(12) United States Patent
Li

(10) Patent No.: US 10,446,090 B2
(45) Date of Patent: Oct. 15, 2019

(54) LED BACKLIGHT DRIVING CIRCUIT AND LIQUID CRYSTAL DISPLAY

(71) Applicant: Shenzhen China Star Optoelectronics Technology Co., Ltd., Shenzhen, Guangdong (CN)

(72) Inventor: Wendong Li, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 62 days.

(21) Appl. No.: 15/745,097

(22) PCT Filed: Jan. 16, 2017

(86) PCT No.: PCT/CN2017/071297
§ 371 (c)(1),
(2) Date: Jan. 15, 2018

(87) PCT Pub. No.: WO2018/126494
PCT Pub. Date: Jul. 12, 2018

(65) Prior Publication Data
US 2019/0019463 A1    Jan. 17, 2019

(30) Foreign Application Priority Data
Jan. 4, 2017    (CN) .......................... 2017 1 00045063

(51) Int. Cl.
*G02F 1/1335*    (2006.01)
*G09G 3/34*    (2006.01)
(Continued)

(52) U.S. Cl.
CPC ..... *G09G 3/3406* (2013.01); *G02F 1/133603* (2013.01); *G09G 3/32* (2013.01);
(Continued)

(58) Field of Classification Search
CPC . G09G 3/3406; G09G 3/342; G09G 2320/064
See application file for complete search history.

(56) References Cited

U.S. PATENT DOCUMENTS 5,331,256 A * 7/1994 Ogino .................. H01J 29/64
313/442
2008/0093997 A1   4/2008 Chen et al.
(Continued)

FOREIGN PATENT DOCUMENTS

CN    101483951 A    7/2009
CN    101998720 A    3/2011
(Continued)

*Primary Examiner* — Nan-Ying Yang
(74) *Attorney, Agent, or Firm* — Andrew C. Cheng

(57) ABSTRACT

Embodiments of the disclosure disclose a LED backlight driving circuit, including a power source, LED strings, a buck circuit, and a LED controller. The LED strings include at least one string of LED lamps, a positive terminal thereof and the power source are electrically connected. The buck circuit and the LED strings are electrically connected. The LED controller and the buck circuit are electrically connected. The LED controller controls the power source to provide electricity to the LED strings and controls the buck circuit to store energy during a first period. The LED controller controls the buck circuit to provide electricity to the LED strings during a second period. The disclosure further provides a liquid crystal display. The disclosure has the advantage of preventing the LED backlight driving circuit from being damaged easily.

10 Claims, 6 Drawing Sheets

(51) Int. Cl.
*G09G 3/32* (2016.01)
*H05B 33/08* (2006.01)
*F21Y 115/10* (2016.01)

(52) U.S. Cl.
CPC ....... *H05B 33/086* (2013.01); *H05B 33/0815* (2013.01); *F21Y 2115/10* (2016.08); *G09G 3/342* (2013.01); *G09G 2310/0264* (2013.01); *G09G 2320/064* (2013.01); *G09G 2320/0626* (2013.01)

(56) References Cited

U.S. PATENT DOCUMENTS

| | | | | |
|---|---|---|---|---|
| 2009/0267534 | A1* | 10/2009 | Godbole | H05B 33/0815 |
| | | | | 315/294 |
| 2010/0243897 | A1* | 9/2010 | Madhani | G01S 7/4814 |
| | | | | 250/338.4 |
| 2014/0063411 | A1* | 3/2014 | Takahashi | G02F 1/133603 |
| | | | | 349/61 |

FOREIGN PATENT DOCUMENTS

| | | |
|---|---|---|
| CN | 101998725 A | 3/2011 |
| CN | 102137524 A | 7/2011 |
| CN | 102682719 A | 9/2012 |
| CN | 103871371 A | 6/2014 |
| CN | 203645858 U | 6/2014 |
| CN | 105392245 A | 3/2016 |
| CN | 105898958 A | 8/2016 |

* cited by examiner

LED BACKLIGHT DRIVING CIRCUIT AND LIQUID CRYSTAL DISPLAY

This disclosure claims priority to Chinese patent application No. 201710004506.3, entitled "LED BACKLIGHT DRIVING CIRCUIT AND LIQUID CRYSTAL DISPLAY" filed on Jan. 4, 2017, which is incorporated by reference in its entirety.

FIELD OF THE DISCLOSURE

The disclosure relates to a liquid crystal display technical field, and more particularly to a LED backlight driving circuit and a liquid crystal display.

BACKGROUND

The backlight technology of LCD is developed continuously as the display technique is improved constantly. A backlight source of a conventional liquid crystal display adopts a cold cathode fluorescent lamp (CCFL). But the CCFL backlight source has disadvantages such as relatively poor color rendition ability, low luminous efficiency, high discharge voltage, poor discharge property at low temperature, long time for heating till stable gray scale and so on. The backlight source technology using a light emitting diode (LED) backlight source has been developed.

FIG. 1 is a conventional LED backlight driving circuit applied in a liquid crystal display. As shown in FIG. 1, the LED backlight driving circuit includes a boost circuit, a LED controller, a capacitor C1' and a LED strip. The boost circuit includes an inductance L', a diode D', a first transistor Q1' and a first resistor R1'. One end of the inductance L' receives a direct-current voltage Vin input from a power source, the other end of the inductance L' is connected to an anode of the diode D' and a drain electrode of the first transistor Q1'. A gate electrode (control end) of the first transistor Q1' is driven by a first control signal provided by the LED controller. The source electrode of the first transistor Q1' and the ground are electrically connected by the first resistor R1'. A cathode of the diode D' is electrically connected to a positive terminal of the LED strip. The cathode of the diode D' is further connected with the ground by the capacitor C'. A negative terminal of the LED strip is further connected with a second transistor Q2'. A drain electrode of the second transistor Q2' is connected to the negative terminal of the LED strip. A source electrode of the second transistor Q2' and the ground are electrically connected by a second resistor R2'. A gate electrode of the second transistor Q2' is driven by a second control signal provided by the LED controller. The operational current of the LED strip can be increased or decreased by adjusting a duty ratio of the second control signal to control brightness of the LED strip.

The inventor of the disclosure discovers the number of required LED lamps is increasing with enlargement of panels, demands of outdoor display or commercial display in the process of the LED backlight driving circuit above, such as the number of LED lamps included in the LED strip exceeds 16. The LED lamps are series connection, which lead to increase of an output voltage Vout of the inductance L' to drive the LED strip after boosting the voltage, such as over 90V or 100V, so that the first transistor Q1' and the diode D' experience a high level of stress, resulting in shortening life of the first transistor Q1' and the diode D', or even causing damage of the LED backlight driving circuit. Moreover, conversion efficiency of the boost circuit is inversely proportional to boost voltage, which means the conversion efficiency is lower while the voltage is higher. The conversion efficiency of the boost circuit will be reduced, energy is wasted.

SUMMARY

An embodiment of the disclosure provides a LED backlight driving circuit and a liquid crystal display. Which can prevent circuit damage and save energy.

In order to solve the technical problem above, the disclosure provides a LED backlight driving circuit, including a power source, LED strings, a buck circuit, and a LED controller. The LED strings include at least one string of LED lamps, a positive terminal thereof and the power source are electrically connected. The buck circuit and the LED strings are electrically connected. The LED controller and the buck circuit are electrically connected. The LED controller controls the power source to provide electricity to the LED strings and controls the buck circuit to store energy during a first period. The LED controller controls the buck circuit to provide electricity to the LED strings during a second period.

In an embodiment of the disclosure, the buck circuit includes an inductance element, a diode element, a capacitor element and a transistor element. A first terminal of the inductance element and a negative terminal of the LED strings are electrically connected. An anode of the diode element and a second terminal of the inductance element are electrically connected, a cathode of the diode element and positive terminals of the LED strings are electrically connected. One end of the capacitor element and the cathode of the diode element are electrically connected, the other end thereof and a first terminal of the inductance element are electrically connected. A drain electrode of the transistor element is electrically connected with the second terminal of the inductance element, a source electrode of the transistor element is electrically connected to ground, and a control end thereof is electrically connected with the LED controller.

In an embodiment of the disclosure, the LED strings include a first LED string and a second LED string. The first LED string is on a first branch. A positive terminal of the first LED string and the power source are electrically connected. The first LED string includes at least two LED lamps. The second LED string is on a second branch. The second branch and the first branch are parallel connected. A positive terminal of the second LED string and the power source are electrically connected. The second LED string includes at least two LED lamps. The inductance element includes a first inductance and a second inductance. A first terminal of the first inductance and a negative terminal of the first LED string are electrically connected. A first terminal of the second inductance and a negative terminal of the second LED string are electrically connected. The diode element includes a first diode and a second diode. An anode of the first diode and a second terminal of the first inductance are electrically connected. A cathode of the first diode and a positive terminal of the first LED string are electrically connected. An anode of the second diode and a second terminal of the second inductance are electrically connected. A cathode of the second diode and a positive terminal of the second LED string are electrically connected. The capacitor element includes a first capacitor and a second capacitor. One end of the first capacitor and the cathode of the first diode are electrically connected. The other end of the first capacitor and the first terminal of the first inductance are electrically connected. One end of the second capacitor and the cathode of the second diode are electrically connected, the other end thereof and the first terminal of the second inductance are electrically connected. The transistor element includes a first transistor and a second transistor. A drain electrode of the first transistor is electrically connected with the second terminal of the first inductance. A source electrode of the first transistor is electrically connected to the ground. A control end of the first transistor is electrically connected with the LED controller. A drain electrode of the second transistor is connected with the second terminal of the second inductance. A source electrode of the second transistor is electrically connected to the ground. A control end of the second transistor is electrically connected with the LED controller.

In an embodiment of the disclosure, in the first period, the LED controller controls the first transistor and the second transistor to communicate, the first diode and the second diode are cut-off. The power source provides electricity to the first LED string and the second LED string. The power source further provides electricity to the first inductance and the second inductance to store energy in the first inductance and the second inductance. In the second period, the LED controller controls the first transistor and the second transistor to cut-off, the first diode and the second diode are communicated. The first inductance and the second inductance provide electricity to the first LED string and the second LED string respectively through the first diode and the second diode.

In an embodiment of the disclosure, the LED strings include a first LED string and a second LED string. The first LED string is on a first branch, a positive terminal thereof and the power source are electrically connected. The first LED string includes at least two LED lamps. The second LED string is on a second branch. The second branch and the first branch are parallel connected. A positive terminal of the second LED string and the power source are electrically connected. The second LED string includes at least two LED lamps. The inductance element includes a first inductance. A first terminal of the first inductance, a negative terminal of the first LED string and a negative terminal of the second LED string are electrically connected. The diode element includes a first diode. An anode of the first diode and a second terminal of the first inductance are electrically connected. A cathode of the first diode and a positive terminal of the first LED string as well as the second LED string are electrically connected. The capacitor element includes a first capacitor. One end of the first capacitor and the cathode of the first diode are electrically connected, the other end thereof and the first terminal of the first inductance are electrically connected. The transistor element includes a first transistor. A drain electrode of the first transistor is connected with the second terminal of the first inductance. A source electrode of the first transistor is electrically connected to the ground. A control end of the first transistor is electrically connected with the LED controller.

In an embodiment of the disclosure, in the first period, the LED controller controls the first transistor to be communicated and the first diode to be cut-off. The power source provides electricity to the first LED string and the second LED string. The power source further provides electricity to the first inductance to store energy in the first inductance. In the second period, the LED controller controls the first transistor to cut-off, the first diode is communicated. The first inductance provides electricity to the first LED string and the second LED string respectively through the first diode.

In an embodiment of the disclosure, the at least two LED lamps on the first LED string are series connection. The at least two LED lamps on the second LED string are series connection. The number of the LED lamps on the first LED string and that on the second LED string are equal.

In an embodiment of the disclosure, a range of inductance values of the first inductance and the second inductance is 47 μh-100 μh.

In an embodiment of the disclosure, the first period and the second period are included in one cycle.

The disclosure further provides a liquid crystal display, including a liquid crystal panel and a backlight module disposed opposite. The backlight module provides light to the liquid crystal panel to display images on the liquid crystal panel. The backlight module adopts a LED backlight source. The LED backlight source is driven by the LED backlight driving circuit described above.

The embodiments of the disclosure have following beneficial effects.

Stress loaded on devices in the embodiments is relatively small due to replacement of the boost circuit in the prior art by the buck circuit, which will not reduce lift of the devices, or damage the devices. So that the LED backlight driving circuit will not be destroyed easily. Moreover, the problem of low conversion efficiency of the boost circuit in the prior art can be prevented due to absence of the conventional boost circuit, which is benefit for saving energy. And the LED driving circuit in the embodiments can drive a large amount of LED lamps.

BRIEF DESCRIPTION OF THE DRAWINGS

In order to more clearly illustrate embodiments of the disclosure, following figures described in embodiments will be briefly introduced, it is obvious that the drawings are merely some embodiments of the disclosure, a person skilled in the art can obtain other figures according to these figures without creativity.

ILLUSTRATION ON LABELS

110—power source; 120, 420—first LED string; 130—second LED string; 140—LED controller; C3—third capacitor; 200, 300—buck circuit; 210, 310—inductance element; L1—first inductance; L2—second inductance; 220, 320—diode element; D1—first diode; D2—second diode; 230, 330—capacitor element; C1—first capacitor; C2—second capacitor; 240, 340—transistor element; Q1—first transistor; Q2—second transistor.

DETAILED DESCRIPTION OF PREFERRED EMBODIMENTS

Embodiments of the disclosure will be described in detail with reference to the accompanying drawings as follows.

Obviously, the described embodiments are part of embodiments of the disclosure rather than all of them. Based on the embodiments of the disclosure, all other embodiments obtained by a person skilled in the art without creativity should be considered within the scope of protection of the disclosure.

Terms "comprise", "have" and other forms thereof in embodiments, claims and figures of the disclosure indicate exclusive inclusion. Such as processes, methods, systems, products or devices containing a series of steps or elements are not restricted to the listed steps or elements, steps or elements out of list are optionally included. Or other steps or elements inherent in the process, methods, products or devices are optionally included. Moreover, terms "first", "second", "third" are used to distinguish different objects, rather than describing a certain order.

First Embodiment

Figure 1:
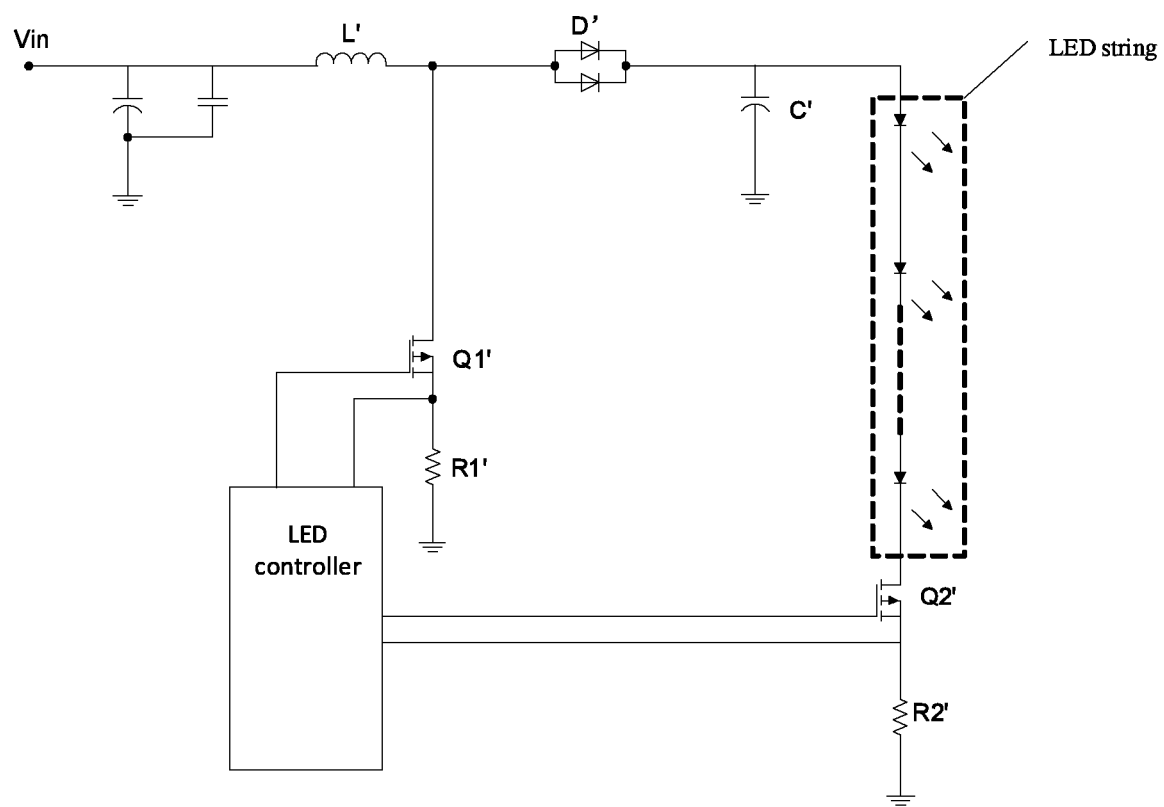
FIG. 1 is a circuit diagram of a LED backlight driving circuit according to the prior art.
Figure 2:
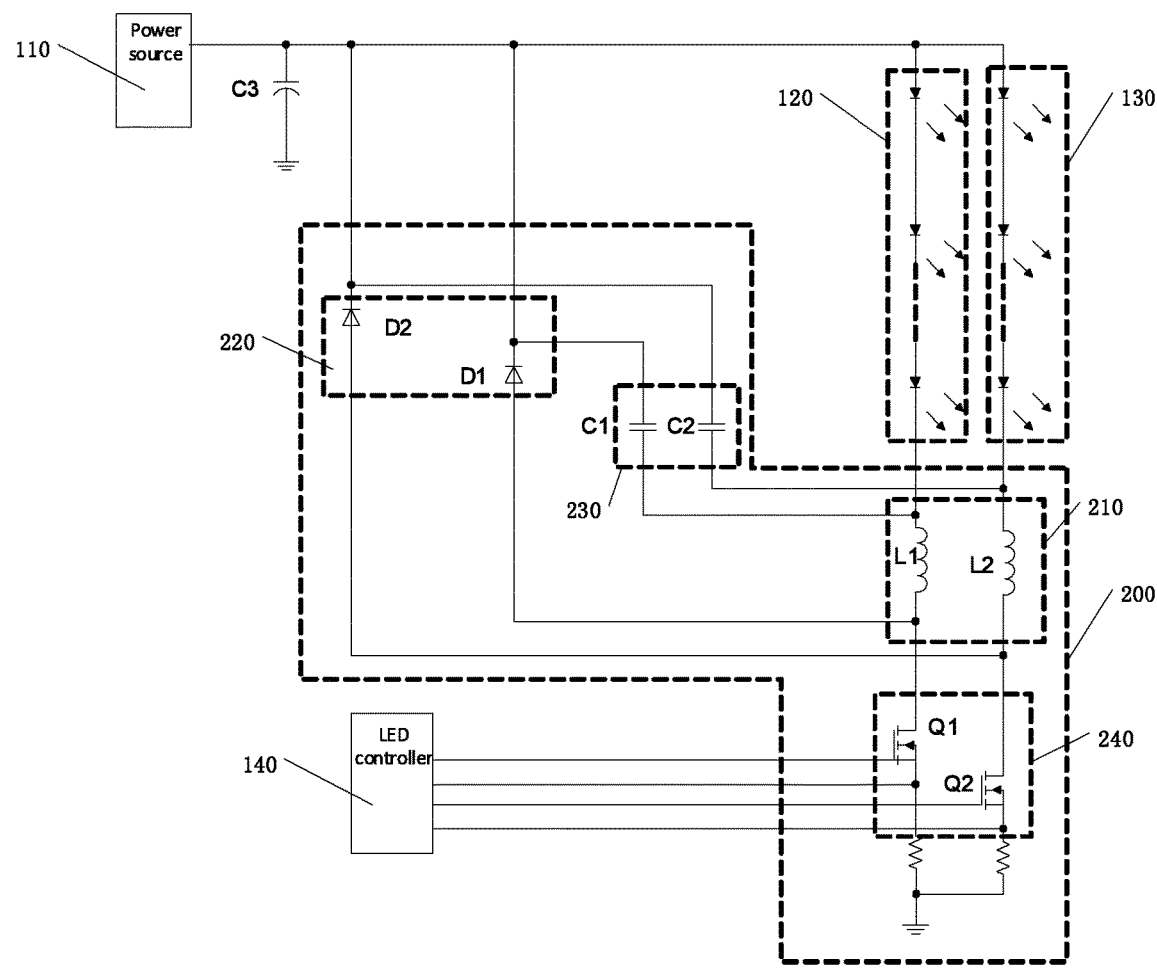
FIG. 2 is a circuit diagram of a LED backlight driving circuit according to a first embodiment of the disclosure.

Referring to FIG. 2, FIG. 2 is a circuit diagram of a LED backlight driving circuit according to a first embodiment of the disclosure. The LED backlight driving circuit includes a power source 110, LED strings, a buck circuit 200 and a LED controller 140.

Specifically, the power source 110 is configured to provide electricity to the LED backlight driving circuit. The power source 110 provided by the embodiment needs to output the higher voltage compared with the power source 110 provided by the prior art. Output voltages such as 36V, 48V, 60V, 72V, etc. are provided to drive the LED string.

The LED strings include at least one string of LED lamps, a positive terminal thereof and the power source are electrically connected. In the embodiment, the LED includes a first LED string 120 and a second LED string 130.

The first LED string 120 is on a first branch. The first LED string 120 includes at least two LED lamps, such as 2 LED lamps, 4 LED lamps, 6 LED lamps, 8 LED lamps, 9 LED lamps, 10 LED lamps, etc. The at least two LED lamps in the embodiment are series connection. However, in other embodiments of the disclosure, the at least two LED lamps can further be parallel connection.

The second LED string 130 is on a second branch. The second branch and the first branch are parallel connected. The second LED string 130 includes at least two LED lamps, such as 2 LED lamps, 4 LED lamps, 6 LED lamps, 8 LED lamps, 9 LED lamps, 10 LED lamps, etc. The at least two LED lamps in the embodiment are series connection. However, in other embodiments of the disclosure, the at least two LED lamps can further be parallel connection. In the embodiment, the number of LED lamps included in the first LED string 120 and the number of LED lamps included in the second LED string 130 are the same, which can balance brightness. Obviously, in other embodiments of the disclosure, the number of LED lamps included in the first LED string and the number of LED lamps included in the second LED string can also be different.

The buck circuit 200 is electrically connected with the first LED string 120 and the second LED string 130 respectively. The buck circuit 200 provides an output voltage lower than that of the power source 110. The voltage provided by the buck circuit 200 is an output voltage such as 30V, 40V, 50V, 60V, etc. The voltage lower than that of the power source 110 is output, resulting in reducing the voltage.

The LED controller 140 and the buck circuit 200 are electrically connected to control the buck circuit 200. The LED controller 140 controls the power source 110 to provide electricity to the first LED string 120 and the second LED string 130 respectively during a first period. The buck circuit 200 stores energy at the moment. The LED lamps in the first LED string 120 and the second LED string 130 can be lit by the power source 110 in the first period. The LED controller controls the buck circuit 200 to provide electricity to the first LED string 120 and the second LED string 130 respectively during a second period. The voltage is lower than the voltage output from the power source 110. The LED lamps in the first LED string 120 and the second LED string 130 can be lit by the buck circuit 200 in the second period. The first period and the second period are different. The first period and the second period are substituted, such as X axis represents time, in sequence of first period-second period-first period-second period . . . , so on and so forth.

Accordingly, in the embodiment, stress loaded on devices in the embodiments is relatively small due to replacement of the boost circuit in the prior art by the buck circuit 200, which will not reduce lift of the devices, or damage the devices. So that the LED backlight driving circuit will not be destroyed easily. Moreover, the problem of low conversion efficiency of the boost circuit in the prior art can be prevented due to absence of the conventional boost circuit, which is benefit for saving energy. And the LED driving circuit in the embodiment can drive a large amount of LED lamps. Brightness of the LED lamps is balanced.

Referring to FIG. 2, the buck circuit 200 includes an inductance element 210, a diode element 220, a capacitor element 230 and a transistor element 240.

The inductance element 210 has a first terminal and a second terminal. The first terminal is electrically connected with negative terminals of the first LED string 120 and the second LED string 130 respectively. An anode of the diode element 220 and a second terminal of the inductance element 210 are electrically connected. A cathode of the diode element 220 is electrically connected with positive terminals of the first LED string 120 and the second LED string 130 respectively. The capacitor element 230 is configured to bootstrap, one end thereof and the cathode of the diode element 220 are electrically connected. The other end thereof and a first terminal of the inductance element 210 are electrically connected. A drain electrode of the transistor element 240 is electrically connected with the second terminal of the inductance element 210, a source electrode thereof is electrically connected to ground. Optionally, in the embodiment, the source electrode of the transistor element 240 is electrically connected to the ground indirectly, a control end thereof (gate electrode) is electrically connected with the LED controller 140. Therefore, the LED controller 140 can control the transistor element 240 to communicate or cut-off.

Specifically, in the embodiment, the inductance element 210 includes a first inductance L1 and a second inductance L2. A first terminal of the first inductance L1 and a negative terminal of the first LED string 120 are electrically connected. A first terminal of the second inductance L2 and a negative terminal of the second LED string 130 are electrically connected. The diode element 220 includes a first diode D1 and a second diode D2. An anode of the first diode D1 and a second terminal of the first inductance L1 are electrically connected. A cathode of the first diode D1 and a positive terminal of the first LED string 120 are electrically connected. An anode of the second diode D2 and a second terminal of the second inductance L2 are electrically connected. A cathode of the second diode D2 and a positive terminal of the second LED string 130 are electrically connected. The capacitor element 230 includes a first capacitor C1 and a second capacitor C2. The first capacitor C1 and the second capacitor C2 are configured to bootstrap. One end of the first capacitor C1 and the cathode of the first diode D1 are electrically connected, the other end thereof and the first terminal of the first inductance L1 are electrically connected. One end of the second capacitor C2 and the cathode of the second diode D2 are electrically connected, the other end thereof and the first terminal of the second inductance L2 are electrically connected. The transistor element 240 includes a first transistor Q1 and a second transistor Q2. A drain electrode of the first transistor Q1 is electrically connected with the second terminal of the first inductance L1, a source electrode thereof is electrically connected to the ground. The source electrode is electrically connected to the ground indirectly in the embodiment. The source electrode is specifically connected to the ground electrically by a resistor. A control end of the first transistor Q1 is electrically connected with the LED controller 140. A drain electrode of the second transistor Q2 is connected with the second terminal of the second inductance L2, a source electrode thereof is electrically connected to the ground. The source electrode is electrically connected to the ground indirectly in the embodiment. The source electrode is specifically connected to the ground electrically by a resistor. A control end of the second transistor Q2 is electrically connected with the LED controller 140.

Figure 3:
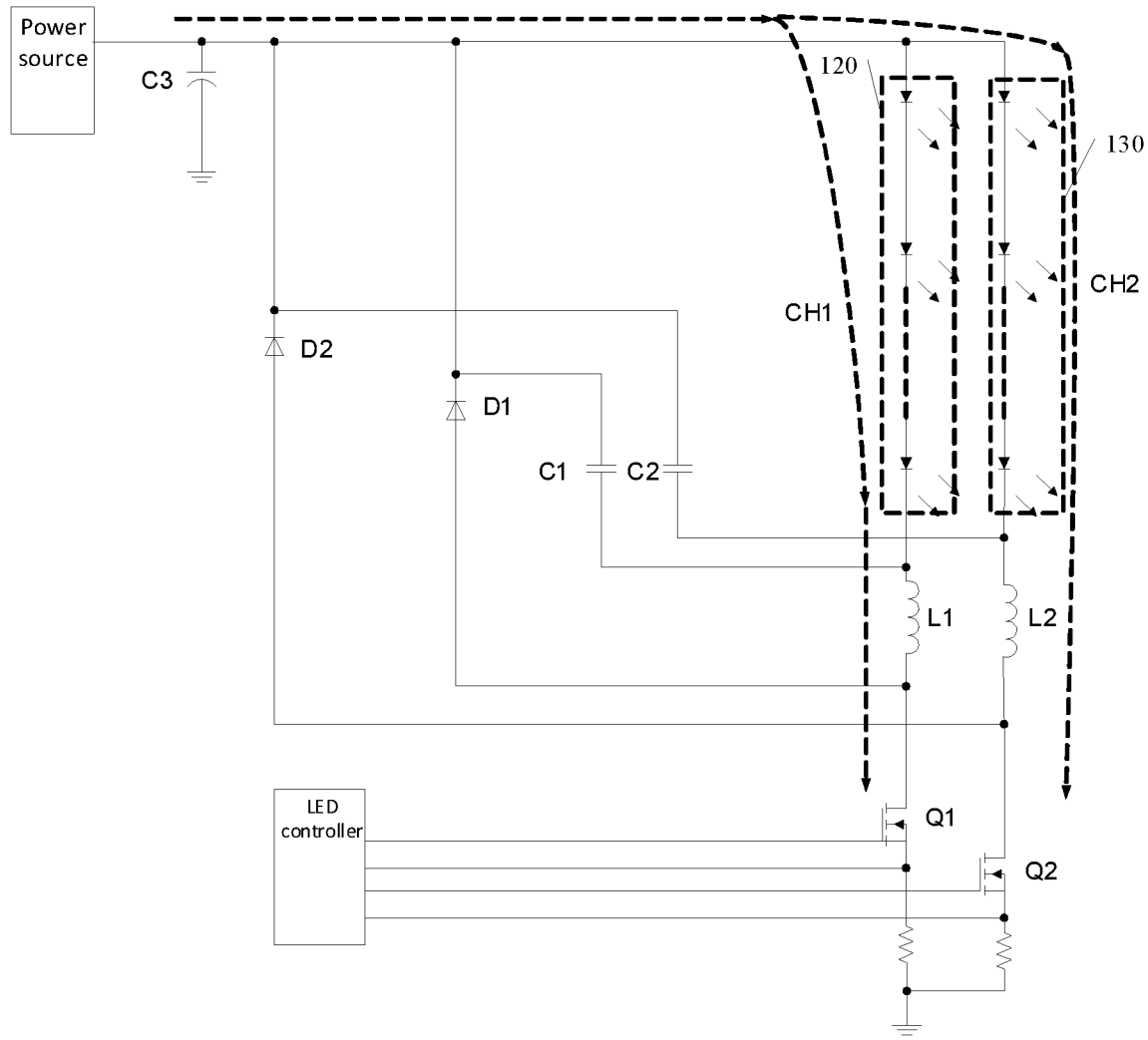
FIG. 3 is a current flow diagram of the LED backlight driving circuit according to the first embodiment of the disclosure in a first period.
Figure 4:
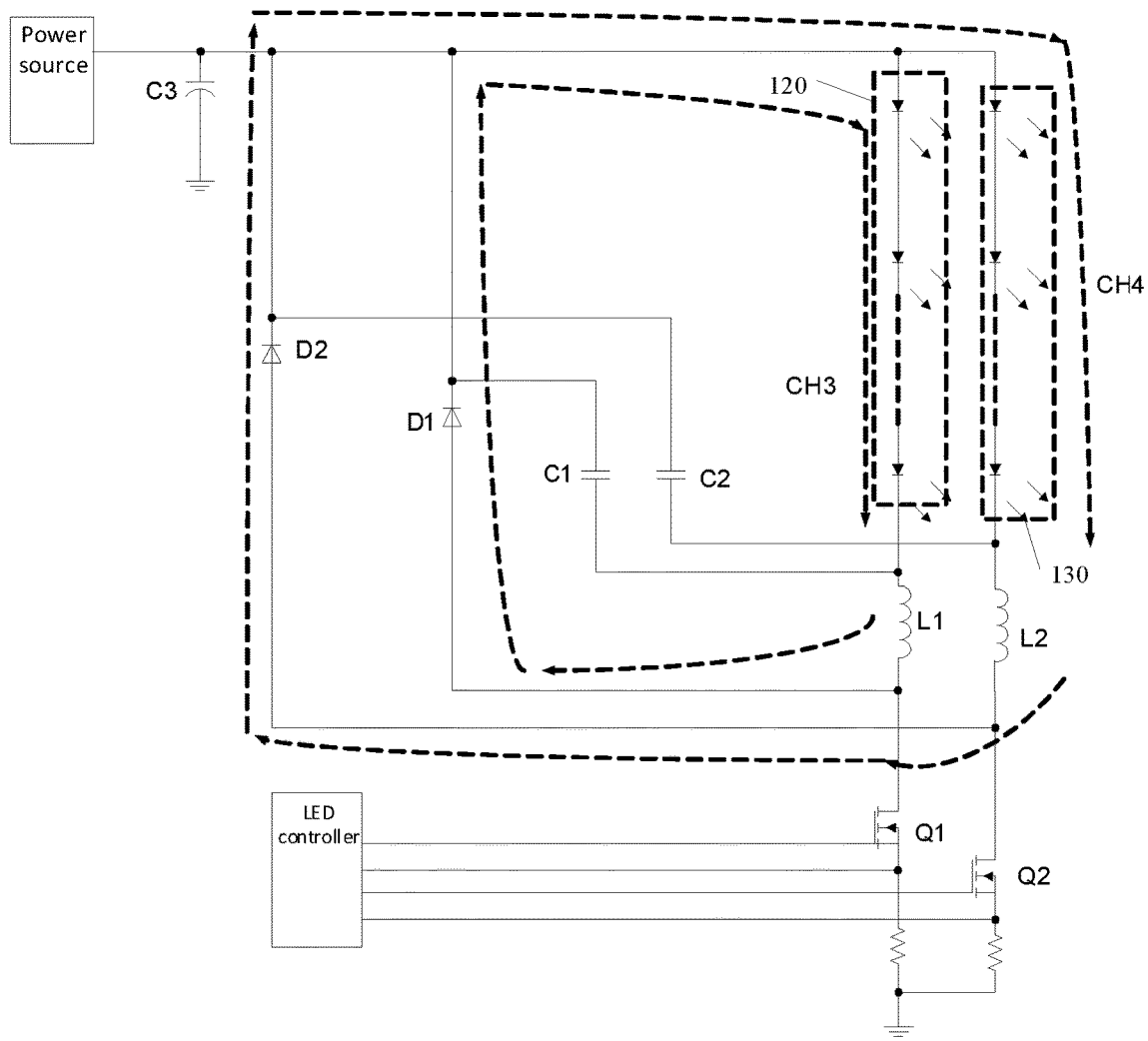
FIG. 4 is a current flow diagram of the LED backlight driving circuit according to the first embodiment of the disclosure in a second period.

Accordingly, the LED controller 140 controls the buck circuit 200 by communicating or cutting off the first transistor Q1 and the second transistor Q2. Specifically, the LED controller 140 controls the first transistor Q1 and the second transistor Q2 to communicate during the first period. The first diode D1 and the second diode D2 are cut-off at the time. Electricity from the power source 110 is output to branches where the first LED string 120 and second LED string 130 are. Therefore, the power source 110 provides electricity to the first LED string 120 and the second LED string 130, as well as storing energy in the first inductance L1 and the second inductance L2. Referring to current flow paths CH1 and CH2 in FIG. 3, the path of current flow is: power source 110→first LED string 120→first inductance L1-first transistor Q1→resistor→ground, and power source 110→second LED string 130→second inductance L2→second transistor Q2→resistor→ground. The LED controller 140 controls the first transistor Q1 and the second transistor Q2 to cut-off during the second period. The first diode D1 and the second diode D2 are communicated at the time. The energy stored in the first inductance L1 and the second inductance L2 is released to be provided to the first LED string 120 and the second LED string 130 respectively. Referring to current flow paths CH3 and CH4 in FIG. 4, the path of current flow is: second terminal of first inductance L1→first diode D1→first LED string 120→first terminal of first inductance L1, and second terminal of second inductance L2→second diode D2→second LED string 130→first terminal of second inductance L2. As the first transistor Q1, the second transistor Q2, the first diode D1 and the second diode D2 are respectively on the negative terminals of the first LED string 120 and the second LED string 130, voltages are relatively low. Stress loaded on the first transistor Q1, the second transistor Q2, the first diode D1 and the second diode D2 is relatively small, which will not reduce lift of the first transistor Q1, the second transistor Q2, the first diode D1 and the second diode D2, or damage the first transistor Q1, the second transistor Q2, the first diode D1 and the second diode D2. So that the LED backlight driving circuit will not be destroyed easily.

In the embodiment, inductance values of the first inductance L1 and the second inductance L2 are required to be relatively large. A range of the first inductance L1 and the second inductance L2 is 47 µh-100 µh, such as 47 µh, 50 µh, 55 µh, 60 µh, 65 µh, 70 µh, 75 µh, 80 µh, 86 µh, 90 µh, 95 µh, 100 µh, etc. So that the ripple current is small. Brightness of the first LED string 120 and the second LED string 130 is even. The problem of LED lamp flashing will not occur.

In the embodiment, the first transistor Q1 and the second transistor Q2 are NMOS transistors. Obviously, in other embodiments of the disclosure, the first transistor and the second transistor can further be switch components equal to the NMOS transistors.

In the embodiment, the first period and the second period form a cycle. In other words, a sum of the first period and the second period is time of a cycle. Specifically, the first period and the second period form the cycle of the first transistor Q1 and the second transistor Q2. For instance, time for the first transistor Q1 and the second transistor Q2 to communicate and cut-off once is one cycle. The sum of the first period and the second period is one cycle of the first transistor Q1 and the second transistor Q2. The cycle is for example 50 microseconds. The first transistor Q1 and the second transistor Q2 repeat periodic actions. But in other embodiments of the disclosure, the first period and the second period can also be shorter than one cycle, which means one cycle can also include a third period or so on. In the disclosure, the first period and the second period are included in one cycle.

In the embodiment, the LED backlight driving circuit further includes a third capacitor C3. One end of the third capacitor C3 and the power source 110 are electrically connected. The other end of the third capacitor C3 is electrically connected to the ground. The third capacitor C3 is configured to filter.

The embodiment further provides a liquid crystal display. The liquid crystal display includes a liquid crystal panel and a backlight module disposed opposite. The backlight module provides light to the liquid crystal panel to display images on the liquid crystal panel. The backlight module adopts a LED backlight source. The LED backlight source is driven by the LED backlight driving circuit described above.

Furthermore, in other embodiments of the disclosure, the LED driving circuit can include a third LED string, a fourth LED string, etc. besides the first LED string and the second LED string. Correspondingly, the buck circuit adds such as a third inductance, a fourth inductance, a third diode, a fourth diode, a third capacitor, a fourth capacitor, etc.

Furthermore, in other embodiments of the disclosure, the LED strings can further include three strings of LED strings, four strings of LED strings, five strings of LED strings, etc.

Second Embodiment

Figure 5:
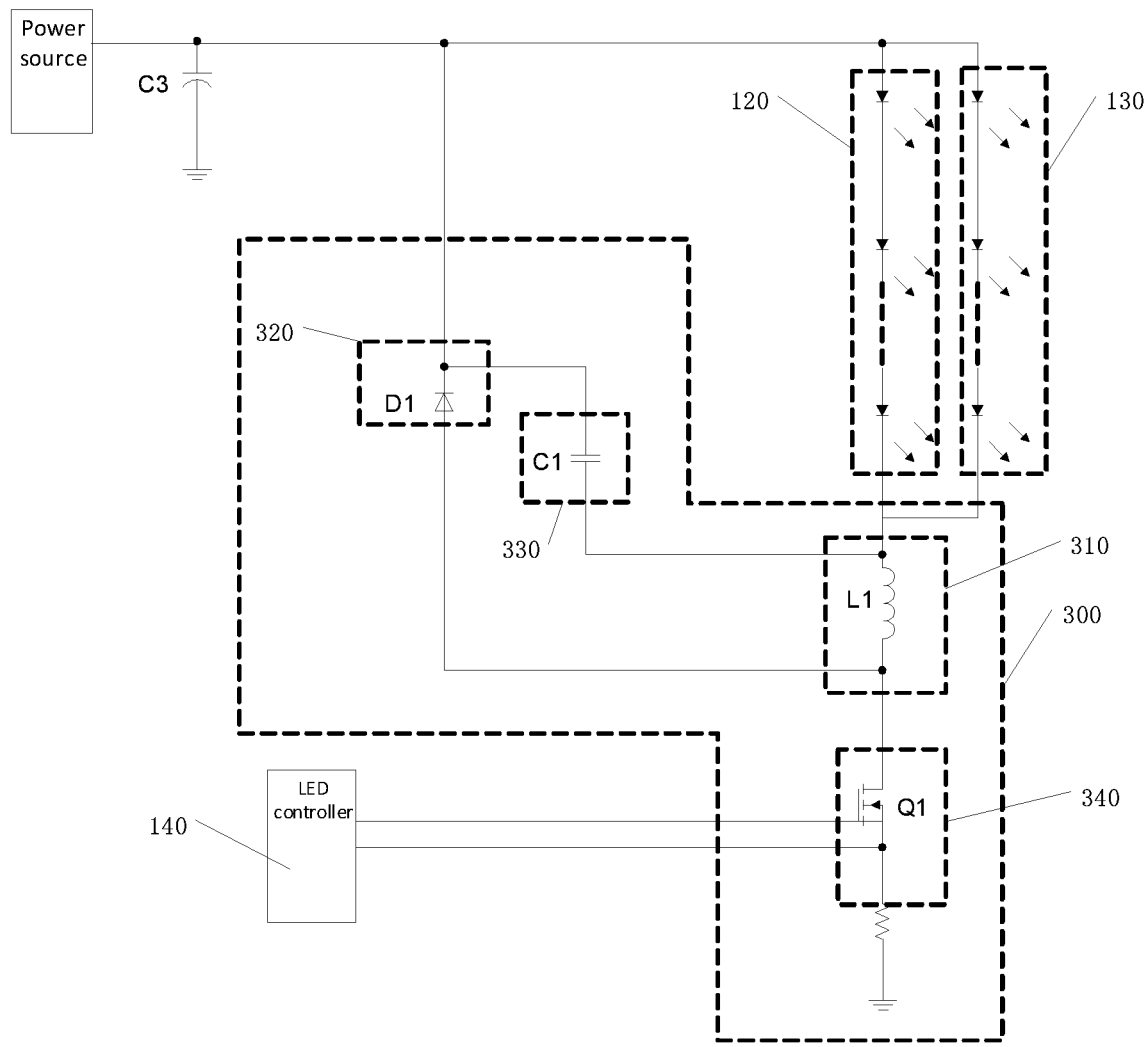
FIG. 5 is a circuit diagram of a LED backlight driving circuit according to a second embodiment of the disclosure.

FIG. 5 is a circuit diagram of a LED backlight driving circuit according to a second embodiment of the disclosure. As the circuit of FIG. 5 and the circuit of FIG. 2 are similar, an identical symbol represents an identical element. The difference of the embodiment and the first embodiment is mainly the buck circuit 300.

Referring to FIG. 5, in the embodiment, the buck circuit 300 includes an inductance element 310, a diode element 320, a capacitor element 330 and a transistor element 340.

The inductance element 310 has a first terminal and a second terminal. The first terminal is electrically connected with negative terminals of the first LED string 120 and the second LED string 130 respectively. An anode of the diode element 320 and a second terminal of the inductance element 310 are electrically connected. A cathode of the diode element 320 are electrically connected with positive terminals of the first LED string 120 and the second LED string 130 respectively. The capacitor element 330 is configured to bootstrap, one end thereof and a pin of the diode element 320 are electrically connected. The other end thereof and a first terminal of the inductance element 310 are electrically connected. A drain electrode of the transistor element 340 is electrically connected with the second terminal of the inductance element 310, a source electrode thereof is electrically connected to the ground. The source electrode is electrically connected to the ground indirectly in the embodiment. The source electrode of the transistor element 340 is electrically connected to the ground by a resistor, a control end thereof (gate electrode) is electrically connected with the LED controller 140. Therefore, the LED controller 140 can control the transistor element 340 to communicate or cut-off.

Specifically, in the embodiment, the inductance element 310 includes a first inductance L1. A first terminal of the first inductance L1 is electrically connected with the negative terminal of the first LED string 120 and the negative terminal of the second LED string 130 respectively. The range of inductance values of the first inductance L1 is 47 μh-100 μh. The diode element 320 includes a first diode D1. An anode of the first diode D1 and a second terminal of the first inductance L1 are electrically connected. A cathode of the first diode D1 is electrically connected with the positive terminal of the first LED string 120 and the positive terminal of the second LED string 130 respectively. The capacitor element 330 includes a first capacitor C1. The first capacitor C1 is configured to bootstrap. One end of the first capacitor C1 and the cathode of the first diode D1 are electrically connected, the other end thereof and the first terminal of the first inductance L1 are electrically connected. The transistor element 340 includes a first transistor Q1. A drain electrode of the first transistor Q1 is electrically connected with the second terminal of the first inductance L1, a source electrode thereof is electrically connected to the ground. The source electrode thereof is electrically connected to the ground indirectly in the embodiment. The source electrode is specifically connected to the ground electrically by a resistor. A control end of the first transistor Q1 is electrically connected with the LED controller 140.

Accordingly, the LED controller 140 controls the buck circuit 300 by communicating or cutting off the first transistor Q1. Specifically, the LED controller 140 controls the first transistor Q1 to communicate during the first period. The first diode D1 is cut-off at the time. Electricity from the power source 110 is output to branches where the first LED string 120 and second LED string 130 are. Therefore, the power source 110 provides electricity to the first LED string 120 and the second LED string 130, as well as storing energy in the first inductance L1. The LED controller 140 controls the first transistor Q1 to cut-off during the second period. The first diode D1 is communicated at the time. The energy stored in the first inductance L1 is released to be provided to the first LED string 120 and the second LED string 130 respectively.

In the embodiment, as the number of components applied in the buck circuit 300 is reduced compared with the first embodiment, costs can be reduced as well.

Third Embodiment

Figure 6:
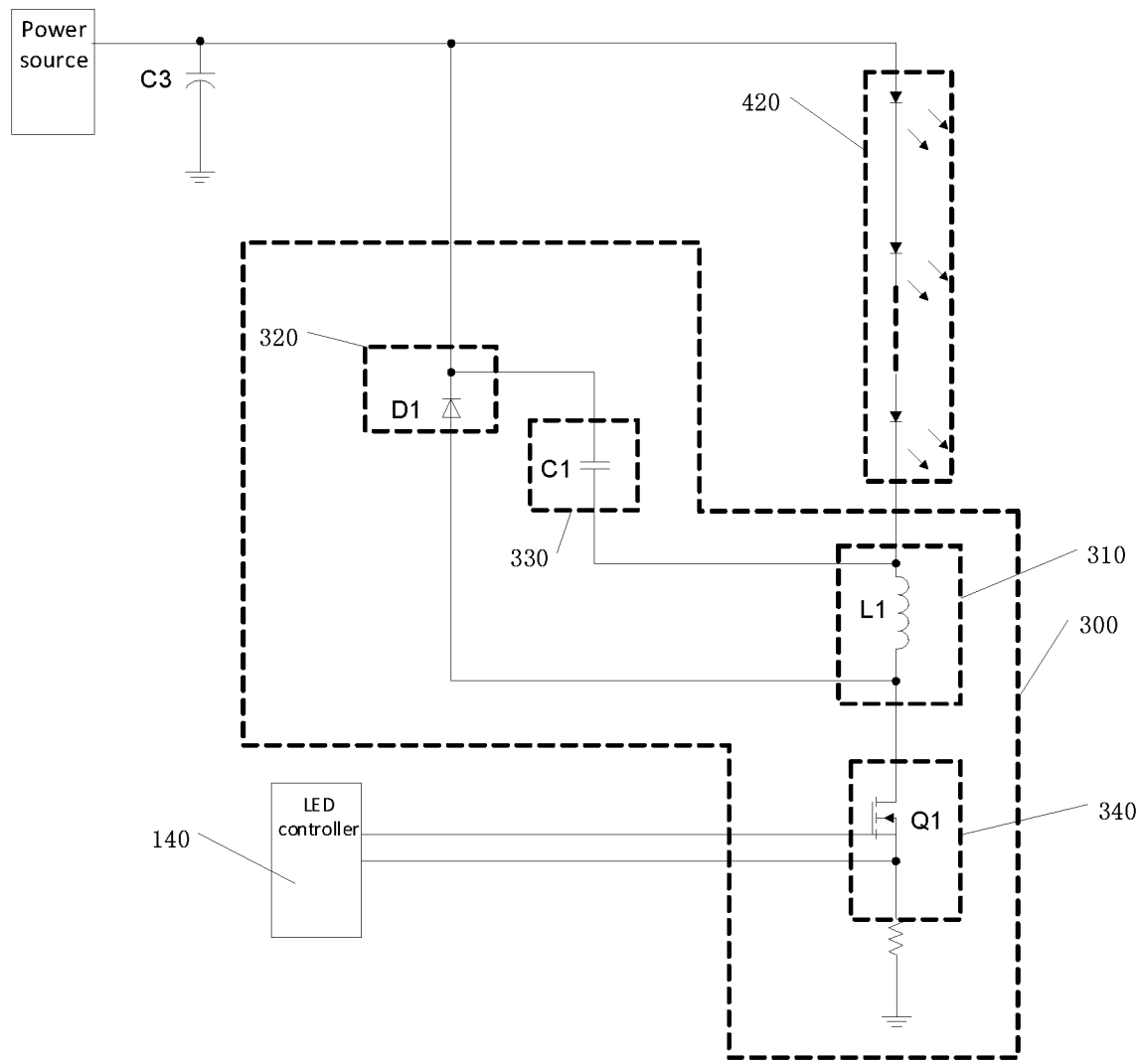
FIG. 6 is a circuit diagram of a LED backlight driving circuit according to a third embodiment of the disclosure.

FIG. 6 is a circuit diagram of a LED backlight driving circuit according to a third embodiment of the disclosure. As the circuit of FIG. 6 and the circuit of FIG. 5 are similar, an identical symbol represents an identical element. The difference of the embodiment and the first embodiment is mainly the number of LED strings.

Referring to FIG. 6, in the embodiment, the LED strings include a first LED string 420, which includes at least one string of LED lamps, a positive terminal thereof and the power source are electrically connected.

The buck circuit 300 includes the inductance element 310, the diode element 320, the capacitor element 330 and the transistor element 340. The inductance element 310 has a first terminal and a second terminal. The first terminal is electrically connected with the negative terminal of the first LED string 420. An anode of the diode element 320 and a second terminal of the inductance element 310 are electrically connected. A cathode of the diode element 320 is electrically connected with the positive terminal of the first LED string 420. The capacitor element 330 is configured to bootstrap, one end thereof and the pin of the diode element 320 are electrically connected. The other end thereof and a first terminal of the inductance element 310 are electrically connected. A drain electrode of the transistor element 340 is electrically connected with the second terminal of the inductance element 310, a source electrode thereof is electrically connected to the ground. The source electrode is electrically connected to the ground indirectly in the embodiment. The source electrode of the transistor element 340 is electrically connected to the ground by a resistor, a control end thereof (gate electrode) is electrically connected with the LED controller 140. Therefore, the LED controller 140 can control the transistor element 340 to communicate or cut-off.

Specifically, in the embodiment, the inductance element 310 includes a first inductance L1. A first terminal of the first inductance L1 and a negative terminal of the first LED string 420 are electrically connected. The range of inductance values of the first inductance L1 is 47 μh-100 μh. The diode element 320 includes the first diode D1. An anode of the first diode D1 and a second terminal of the first inductance L1 are electrically connected. A cathode of the first diode D1 is electrically connected with the positive terminal of the first LED string 420. The capacitor element 330 includes the first capacitor C1. The first capacitor C1 is configured to bootstrap. One end of the first capacitor C1 and the cathode of the first diode D1 are electrically connected, the other end thereof and the first terminal of the first inductance L1 are electrically connected. The transistor element 340 includes a first transistor Q1. A drain electrode of the first transistor Q1 is electrically connected with the second terminal of the first inductance L1, a source electrode thereof is electrically connected to the ground. The source electrode thereof is electrically connected to the ground indirectly in the embodiment. The source electrode is specifically connected to the ground electrically by a resistor. The control end of the first transistor Q1 is electrically connected with the LED controller 140.

Accordingly, the LED controller 140 controls the buck circuit 300 by communicating or cutting off the first transistor Q1. Specifically, the LED controller 140 controls the first transistor Q1 to communicate during the first period. The first diode D1 is cut-off at the time. Electricity from the power source 110 is output to the branch where the first LED string 420 is. Therefore, the power source 110 provides electricity to the first LED string 420 and stores energy in the first inductance L1. The LED controller 140 controls the first transistor Q1 to cut-off during the second period. The first diode D1 is communicated at the time. The energy stored in the first inductance L1 is released to be provided to the first LED string 420.

The problem of low conversion efficiency of the boost circuit in the prior art can be prevented due to absence of the boost circuit in the embodiment, which is benefit for saving energy. Moreover, stress loaded on components in the embodiment is relatively small due to replacement of the boost circuit in the prior art by the buck circuit, which will not reduce lift of the components, or damage the components. So that the LED backlight driving circuit will not be destroyed easily.

It needs to be illustrated that each of the embodiments in the disclosure is described in a sequence of progression. The emphasis of each of the embodiments is the difference from the other embodiments. Same or similar sections among the embodiments can be referred mutually. As the embodiments on devices are almost the same with the embodiments on methods, description will be simple. Related sections can be referred to illustration in the embodiments on methods.

The disclosure has following advantages by description of the embodiment above.

Stress loaded on components in the embodiments is relatively small due to replacement of the boost circuit in the prior art by the buck circuit, which will not reduce lift of the components, or damage the components. So that the LED backlight driving circuit will not be destroyed easily. Moreover, the problem of low conversion efficiency of the boost circuit in the prior art can be prevented due to absence of the conventional boost circuit, which is benefit for saving energy. And the LED driving circuit in the embodiment can drive a large amount of LED lamps. Brightness of the LED lamps is balanced.

The disclosed above is merely preferred embodiments of the disclosure, which cannot limit the protection scope of the disclosure. Equivalent modification within the spirit of the claims of the disclosure should be covered by the protected scope of the disclosure.

What is claimed is:

1. A LED backlight driving circuit, comprising:
a power source;
LED strings, comprising at least one string of LED lamps, a positive terminal thereof and the power source electrically connected;
a buck circuit, electrically connected with the LED strings;
a LED controller, electrically connected with the buck circuit, the LED controller controlling the power source to provide electricity to the LED strings and controlling the buck circuit to store energy during a first period, the LED controller controlling the buck circuit to provide electricity to the LED strings during a second period;
wherein the buck circuit comprises:
an inductance element, a first terminal thereof and a negative terminal of the LED strings are electrically connected;
a diode element, an anode thereof and a second terminal of the inductance element are electrically connected, a cathode thereof and a positive terminal of the LED strings are electrically connected;
a capacitor element, one end thereof and the cathode of the diode element are electrically connected, the other end thereof and a first terminal of the inductance element are electrically connected;
a transistor element, a drain electrode thereof is electrically connected with the second terminal of the inductance element, a source electrode thereof is electrically connected to ground, a control end thereof is electrically connected with the LED controller; and
wherein the LED strings comprise a first LED string and a second LED string, the first LED string is on a first branch, a positive terminal thereof and the power source are electrically connected, the first LED string comprises at least two LED lamps; the second LED string is on a second branch, the second branch and the first branch are parallel connected, a positive terminal of the second LED string and the power source are electrically connected, the second LED string comprises at least two LED lamps;
the inductance element comprises a first inductance, a first terminal of the first inductance is electrically connected with a negative terminal of the first LED string and a negative terminal of the second LED string;
the diode element comprises a first diode, an anode of the first diode and a second terminal of the first inductance are electrically connected, a cathode of the first diode is electrically connected with positive terminals of the first LED string and the second LED string;
the capacitor element comprises a first capacitor, one end of the first capacitor and the cathode of the first diode are electrically connected, the other end thereof and the first terminal of the first inductance are electrically connected;
the transistor element comprises a first transistor, a drain electrode of the first transistor is connected with the second terminal of the first inductance, a source electrode of the first transistor is electrically connected to the ground, a control end of the first transistor is electrically connected with the LED controller.

2. The LED backlight driving circuit according to claim 1, wherein in the first period, the LED controller controls the first transistor to be communicated and the first diode to be cut-off, the power source provides electricity to the first LED string and the second LED string, the power source further provides electricity to the first inductance to store energy in the first inductance; in the second period, the LED controller controls the first transistor to cut-off and the first diode to be communicated, the first inductance provides electricity to the first LED string and the second LED string respectively through the first diode.

3. The LED backlight driving circuit according to claim 1, wherein the at least two LED lamps on the first LED string are series connection, at least two LED lamps on the second LED string are series connection, the number of the LED lamps on the first LED string and that on the second LED string are equal.

4. The LED backlight driving circuit according to claim 1, wherein the inductance element comprises an inductance, a range of inductance values of the inductance is 47 μh-100μh.

5. The LED backlight driving circuit according to claim 1, wherein the first period and the second period are comprised in one cycle.

6. A liquid crystal display, comprising a liquid crystal panel and a backlight module disposed opposite, the backlight module providing light to the liquid crystal panel to display images on the liquid crystal panel; the backlight module adopting a LED backlight source, wherein the LED backlight source adopting a LED backlight driving circuit; the LED backlight driving circuit comprising:
a power source;
LED strings, comprising at least one string of LED lamps, wherein a positive terminal thereof and the power source are electrically connected;
a buck circuit, electrically connected with the LED strings;
a LED controller, electrically connected with the buck circuit; wherein the LED controller controls the power source to provide electricity to the LED strings and controls the buck circuit to store energy during a first period, the LED controller controls the buck circuit to provide electricity to the LED strings during a second period;
wherein the buck circuit comprises:

an inductance element, wherein a first terminal thereof and a negative terminal of the LED strings are electrically connected;

a diode element, wherein an anode thereof and a second terminal of the inductance element are electrically connected, a cathode thereof and a positive terminal of the LED strings are electrically connected;

a capacitor element, wherein one end thereof and the cathode of the diode element are electrically connected, the other end thereof and a first terminal of the inductance element are electrically connected;

a transistor element, wherein a drain electrode thereof is electrically connected with the second terminal of the inductance element, a source electrode thereof is electrically grounded, a control end thereof is electrically connected with the LED controller; and wherein the LED strings comprise a first LED string and a second LED string, the first LED string is on a first branch, a positive terminal thereof and the power source are electrically connected, the first LED string comprises at least two LED lamps; the second LED string is on a second branch parallel connected with the first branch, a positive terminal of the second LED string and the power source are electrically connected, the second LED string comprises at least two LED lamps;

wherein the inductance element comprises a first inductance, a first terminal of the first inductance is electrically connected with a negative terminal of the first LED string and a negative terminal of the second LED string;

wherein the diode element comprises a first diode, an anode of the first diode and a second terminal of the first inductance are electrically connected, a cathode of the first diode is electrically connected with positive terminals of the first LED string and the second LED string;

wherein the capacitor element comprises a first capacitor, one end of the first capacitor and the cathode of the first diode are electrically connected, the other end of the first capacitor and the first terminal of the first inductance are electrically connected;

wherein the transistor element comprises a first transistor, a drain electrode of the first transistor is connected with the second terminal of the first inductance, a source electrode of the first transistor is electrically grounded, a control end of the first transistor is electrically connected with the LED controller.

7. The liquid crystal display according to claim 6, wherein in the first period, the LED controller controls the first transistor to be communicated, the first diode is cut-off, the power source provides electricity to the first LED string and the second LED string, the power source further provides electricity to the first inductance for storing energy in the first inductance; in the second period, the LED controller controls the first transistor to be cut-off and the first diode to be communicated, the first inductance provides electricity to the first LED string and the second LED string respectively through the first diode.

8. The liquid crystal display according to claim 6, wherein the at least two LED lamps on the first LED string are series connection, at least two LED lamps on the second LED string are series connection, the number of the LED lamps on the first LED string and that on the second LED string are equal.

9. The liquid crystal display according to claim 6, wherein the inductance element comprises an inductance, a range of inductance values of the inductance is 47 μh-100 μh.

10. The liquid crystal display according to claim 6, wherein the first period and the second period are comprised in one cycle.

* * * * *